United States Patent
Nelson et al.

(10) Patent No.: US 9,122,622 B1
(45) Date of Patent: Sep. 1, 2015

(54) CONFIGURABLE INPUT/OUTPUT CONTROLLER SYSTEM

(71) Applicant: Digital Dynamics, Inc., Scotts Valley, CA (US)

(72) Inventors: Craig A. Nelson, Ben Lomond, CA (US); Stephen J. Fricke, Felton, CA (US)

(73) Assignee: Digital Dynamics, Inc., Scotts Valley, CA (US)

( * ) Notice: Subject to any disclaimer, the term of this patent is extended or adjusted under 35 U.S.C. 154(b) by 0 days.

(21) Appl. No.: 14/178,802

(22) Filed: Feb. 12, 2014

Related U.S. Application Data

(60) Provisional application No. 61/769,629, filed on Feb. 26, 2013.

(51) Int. Cl.
| | |
|---|---|
| *G06F 3/00* | (2006.01) |
| *G06F 13/00* | (2006.01) |
| *G06F 13/10* | (2006.01) |
| *G06F 13/38* | (2006.01) |

(52) U.S. Cl.
CPC ............ *G06F 13/102* (2013.01); *G06F 13/385* (2013.01)

(58) Field of Classification Search
CPC ................................ G06F 13/385; G06F 13/12
See application file for complete search history.

(56) References Cited

U.S. PATENT DOCUMENTS

| | | | |
|---|---|---|---|
| 6,112,132 A | 8/2000 | Grube | |
| 7,024,660 B2 | 4/2006 | Andrade et al. | |
| 7,085,670 B2 | 8/2006 | Odom et al. | |
| 7,290,244 B2 | 10/2007 | Peck et al. | |
| 7,316,009 B2 | 1/2008 | Peck | |
| 7,340,684 B2 | 3/2008 | Ramamoorthy et al. | |
| 7,979,264 B2 * | 7/2011 | Khan et al. | 703/24 |
| 8,239,158 B2 | 8/2012 | Crain, II et al. | |
| 2006/0015862 A1 | 1/2006 | Odom et al. | |
| 2012/0179854 A1 * | 7/2012 | Noyes | 711/5 |

* cited by examiner

*Primary Examiner* — Zachary K Huson
(74) *Attorney, Agent, or Firm* — Edward B. Weller

(57) ABSTRACT

In one embodiment, a controller system comprises a plurality of remote interface modules and a control module. Each remote interface module is configured to be coupled to a corresponding controlled system for receiving first input signals therefrom, providing first output signals thereto, and generating first data signals based on the first input signals. The control module is coupled to the remote interface modules to receive the first data signals from the remote interface modules, and provide second data signals to the remote interface modules. The control module is configured to receive second input signals from a host computer and to provide second output signals to the host computer. The control module is configurable to selectively generate the second data signals and the second output signals based on the first data signals, the second input signals, and configuration equations.

25 Claims, 16 Drawing Sheets

**Input Configuration
Lookup Table (LUT)**

| | Inputs → 64 | | | | |
|---|---|---|---|---|---|
| 0 | Din | I4 | I7 | I15 | ••• |
| 1 | | | | | |
| 2 | Dout | | | | |
| ⋮ | | | | | |
| 62 | | | | | |
| 64 63 | | | | | |

(Interlocks ↓)

FIG. 8

**Sout Interlock Output
Lookup Table (LUT)**

| 514 Sout (0-1023) | 740 Dout Select (0-1023) | 741 RIM Select (0-31) | 742 Interlock Gates Select (0-63) |
|---|---|---|---|
| 0 | 9 | 4 | 5 |
| 1 | | | |
| 2 | | | |
| ⋮ | | • | |
| 1022 | | | |
| 1023 | | | |

FIG. 9

| Header 1502 | Ack 1503 | Data 1504 | Checksum 1506 |

| Header 1602 | Ack 1603 | Delta Time To Commit 1604 | Checksum 1606 |

CONFIGURABLE INPUT/OUTPUT CONTROLLER SYSTEM

CROSS-REFERENCE TO RELATED APPLICATION

This application claims the benefit and priority of U.S. Provisional Patent Application No. 61/769,629, entitled "Configurable Input/Output Controller System," filed on Feb. 26, 2013, which is incorporated by reference herein in its entirety.

BACKGROUND

The disclosure relates to input/output controller systems, and in particular, configurable input/output controller systems.

Input/output controller systems are used for embedded machine control to control equipment, such as semiconductor-manufacturing equipment, by controlling timing and sequences of operation of the equipment to control semiconductor fabrication processes. The input/output controller systems provide control signals to the equipment, which may be heaters, turbo pumps, radio frequency (RF) generators, liquid baths, mechanical hoists, hazardous gas piping equipment, and robotic transfer arms. The input/output controller system receives information from the equipment through sensors, such as temperature sensors or door open/close sensors. A host computer communicates with the input/output controller system to control the input/output controller system and the semiconductor-manufacturing equipment.

FIG. 1 is a block diagram illustrating a conventional input/output controller system 100. System 100 comprises a host computer 102, a controller system 104, and one to four tool elements 106a through 106d. Host computer 102 communicates with controller system 104 via an Ethernet 107. Host computer 102 controls the overall activity of system 100 by sending commands to controller system 104, which in turn activates corresponding tool elements 106. Controller system 104 communicates with the plurality of tool elements 106 for the semiconductor-manufacturing equipment via a plurality of signal wires 108.

Controller system 104 comprises one to four input/output controllers 110a through 110d, and a router 112. Router 112 communicates with host computer 102 via Ethernet 107. Router 112 communicates with input/output controllers 110a through 110d via one to four Ethernet cables 114a through 114d, respectively. Each input/output controller 110 communicates with a corresponding tool 106 via signal wires 108. Each input/output controller 110 handles up to 88 digital-in/digital-out signals.

Input/output controller 110 comprises an input/output (I/O) controller 120, a hardwired interlock module 122, and a hardwired field connect board 124. (For simplicity and clarity, reference numerals are shown for only one input/output controller 110.) I/O controller 120 includes a central processing unit (CPU) 140. CPU 140 communicates with router 112 via Ethernet cable 114. I/O controller 120 is coupled to hardwired interlock module 122 by signal wires 132 for communicating data and controls signals. I/O controller 120 is coupled to hardwired field connect board 124 by signal wires 134 for communicating data and controls signals. CPU 140 controls the I/O controller 120 and hardwired interlock module 122 and hardwired field connect board 124. Hardwired interlock module 122 is coupled to hardwired field connect board 124 by signal wires 136 for communicating data and controls signals. Hardwired field connect board 124 communicates with tool 106 via signal wires 108.

Signal wires 108 are implemented as wires arranged in cables that are physically connected to hardwired field connect board 124 and tool 106. Hardwired interlock module 122 and hardwired field connect board 124 are custom designs for each set of tool elements 106 for each customer and formed as circuit boards. Thus, hardwired interlock module 122 and hardwired field connect board 124 must be rewired when the corresponding tool 106 is changed. A change to a tool 106 may also require a change to a signal wire 108 or the addition of signal wires 109 between hardwired field connect boards 124 of different input/output controllers 110. Consequently, adding an additional switch or sensor to one of the tool elements 106 is expensive and time consuming.

SUMMARY

Embodiments of the present invention include systems and methods for input/output control. In one embodiment, the present invention includes a controller system comprising a plurality of remote interface modules and a control module. Each remote interface module is configured to be coupled to a corresponding controlled system for receiving a first plurality of input signals from the corresponding controlled system, providing a first plurality of output signals to the corresponding controlled system, and generating a first plurality of data signals based on the first plurality of input signals. The control module includes an interface coupled to the plurality of remote interface modules to receive the first plurality of data signals from the plurality of remote interface modules, and provide a second plurality of data signals to the plurality of remote interface modules. The control module is configured to receive a second plurality of input signals from a host computer and to provide a second plurality of output signals to the host computer. The control module is configurable to selectively generate the second plurality of data signals and the second plurality of output signals based on the first plurality of data signals, the second plurality of input signals, and a first plurality of configuration equations.

In one embodiment, the first plurality of configuration equations include associations between the first plurality of input signals, the second plurality of input signals, the first plurality of output signals, and the second plurality of output signals.

In one embodiment, the first plurality of configuration equations includes interlock equations.

In one embodiment, the interlock equations includes safety interlock equations to prevent specified actions by the controlled system.

In one embodiment, the control module includes an input multiplexer configured to receive the first plurality of data signals and the second plurality of input signals and/or includes an output multiplexer configured to provide the second plurality of data signals and the second plurality of output signals. The first plurality of configuration equations includes multiplexer equations for configuring the input multiplexer or the output multiplexer or both.

In one embodiment, the controller system further comprises a plurality of data channels. Each data channel is coupled between the control module and a corresponding remote interface module. Each data channel includes two or more data links. Each data link provides a corresponding one of the second plurality of data signals as a redundant signal.

In one embodiment, the control module includes at least two first configurable logic circuits. Each first configurable logic circuit is coupled to a respective data link of each of the plurality of data channels.

In one embodiment, the remote interface module includes at least two second configurable logic circuits. Each second configurable logic circuit is coupled to a respective data link of each of the plurality of data channels.

In one embodiment, the control module comprises a configurable logic circuit that is configured to be coupled to an external programmer to program the configurable logic circuit based on the first plurality of configuration equations. The programmer is further configured to receive a spreadsheet. The spreadsheet comprises associations between the first plurality of input signals, the second plurality of input signals, the first plurality of output signals, the second plurality of output signals, and configuration conditions.

In one embodiment, the control module further comprises another interface configured to provide the first plurality of data signals, the second plurality of data signals, the second plurality of input signals, the second plurality of output signals, and the first plurality of configuration equations to an external device.

The following detailed description and accompanying drawings provide a better understanding of the nature and advantages of the present invention.

BRIEF DESCRIPTION OF THE DRAWINGS

FIG. 8 is a diagram illustrating an input configuration lookup table for the interlock circuit of FIG. 6.

FIG. 9 is a diagram illustrating an output interlock lookup table for the interlock circuit of FIG. 6.

FIG. 15 illustrates a diagram of a data packet of the input/output controller system of FIG. 2.

FIG. 16 illustrates a diagram of a commit packet of the input/output controller system of FIG. 2.

DETAILED DESCRIPTION

Described herein are systems and techniques for configurable input/output controllers. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
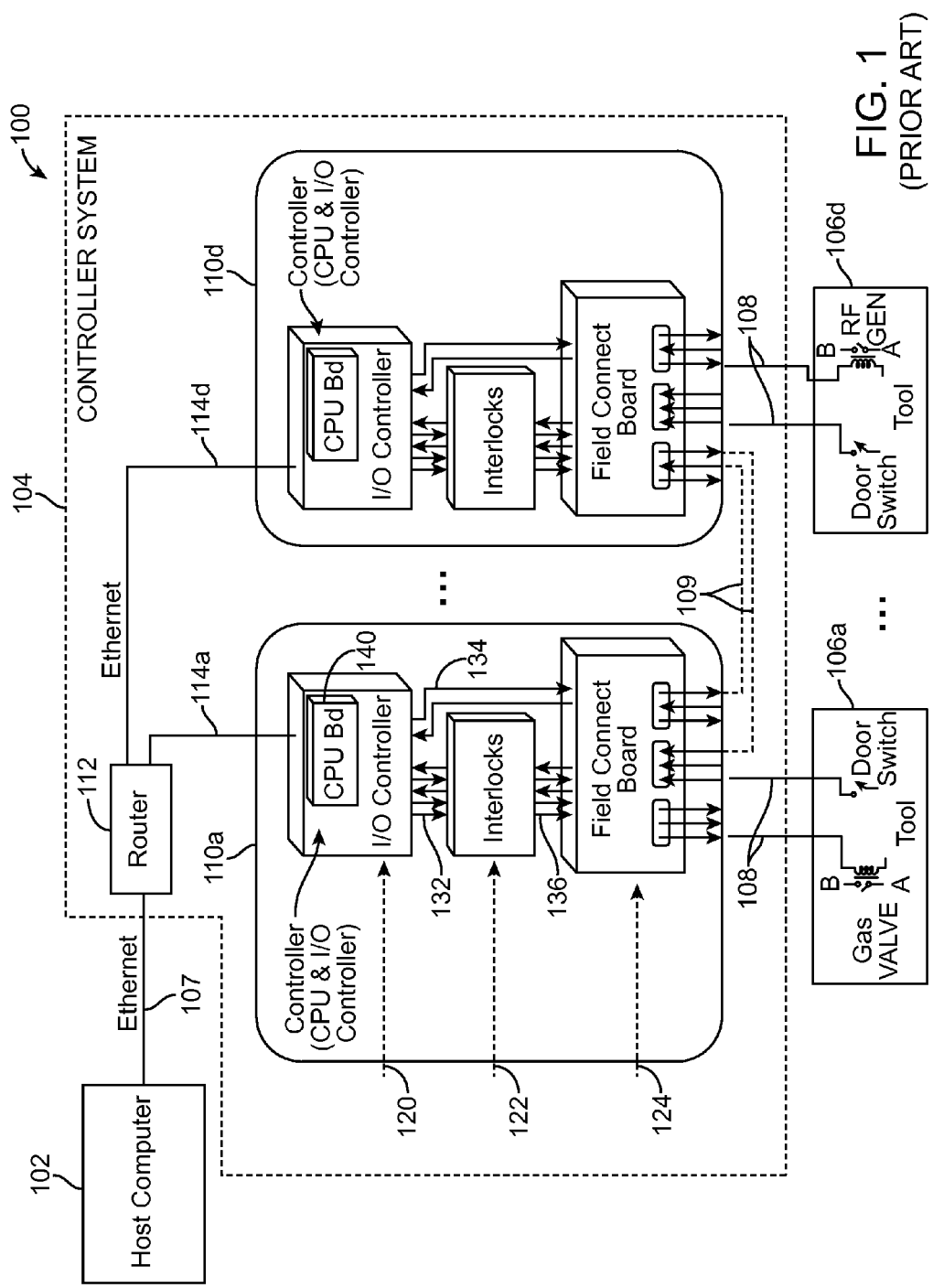
FIG. 1 is a block diagram illustrating a conventional input/output controller system.
Figure 2:
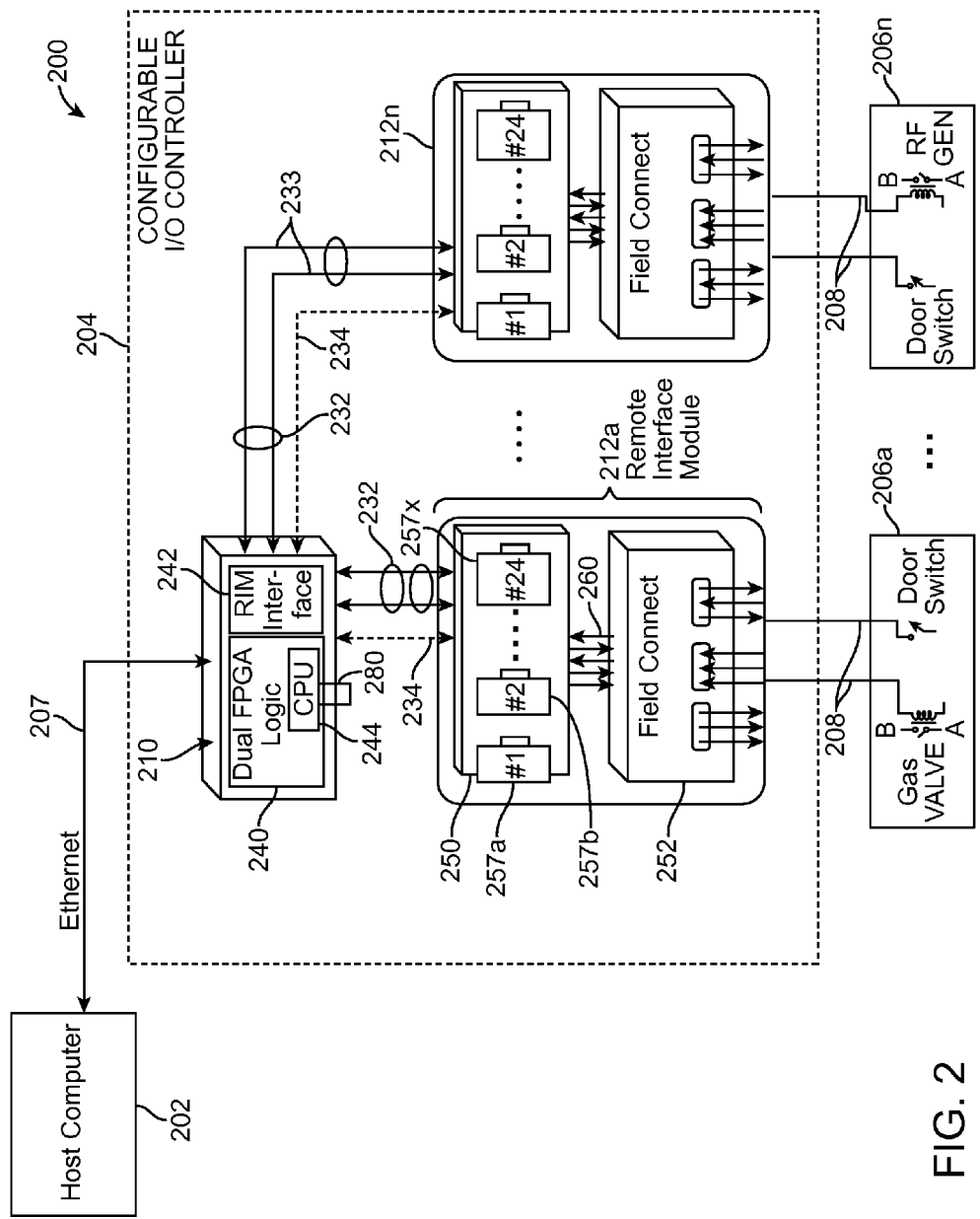
FIG. 2 is a block diagram illustrating a configurable input/output controller system according to innovations herein.

FIG. 2 is a block diagram illustrating a configurable input/output controller system 200 according to innovations herein. System 200 comprises a host computer 202, a configurable input/output (I/O) controller 204, and a plurality of controlled systems 206a through 206n. Host computer 202 communicates with configurable I/O controller 204 via a communication channel 207, such as an Ethernet. For convenience, "communication channel 207" is used interchangeably herein with "Ethernet 207". Configurable I/O controller 204 communicates with controlled systems 206 via a corresponding one of a plurality of data channels 208. For convenience, "data channel 208" is used interchangeably herein with "cable 208" and "signal 208". In various embodiments, configurable I/O controller 204 controls features, such as timing and sequence, of processes performed by controlled systems 206. In some embodiments, controlled systems 206 includes semiconductor-manufacturing equipment, which may be, for example, heaters, turbo pumps, radio frequency (RF) generators, liquid baths, mechanical hoists, hazardous gas piping equipment, and robotic transfer arms. For example, in semiconductor processes, configurable I/O controller 204 may control flow of various gases into and out of chambers. Because of the properties of the gases, process requirements, and dimensions of the semiconductor devices, the control system provides precise control and timing of the manufacturing processes. Controlled systems 206 may include sensors (such as temperature, pressure, or door open or closed status). For convenience, controlled system 206 is used interchangeably herein with equipment 206. The end user controls input/output controller system 200 using the host computer 202 to provide data, instructions, and configuration information to and receive data from configurable I/O controller 204.

In various embodiments, configurable I/O controller 204 provides input/output control, associations, routing, and interlocks for equipment 206 based on configuration equations. Configurable I/O controller 204 receives digital input signals and analog input signals from host computer 202 and equipment 206, and generates digital output signals and analog output signals that are provided to host computer 202 and equipment 206.

In various embodiments, the configuration equations include associations between signals received by configurable I/O controller 204 from host computer 202 and equipment 206, signals provided by configurable I/O controller 204 to host computer 202 and equipment 206, and configuration conditions. The configuration conditions may be, for example, interlock equations. In some embodiments, the interlock equations include safety interlocks. In various embodiments, the safety interlocks are to prevent specified actions by equipment 206, such as undesired actions, e.g., release of gases at times other than at specified times and under specified conditions, such as all chamber doors being closed.

In various embodiments, configurable I/O controller 204 may be configured or reconfigured by an external programmer (not shown) coupled to configurable I/O controller 204 via Ethernet 207. In some embodiments, the programmer receives a spreadsheet, such an Excel® spreadsheet (registered trademark of Microsoft Corporation), that include the configuration equations. The programmer compiles the spreadsheet for programming configurable I/O controller 204. If equipment 206 is added or changed, configurable I/O controller 204 may be reconfigured by changing the configuration equations in the spreadsheet and reprogramming configurable I/O controller 204. In some embodiments, host computer 202 performs the functions of the external programmer.

Configurable I/O controller 204 comprises a control module 210 and a plurality of remote interface modules 212a through 212n. (As an illustrative embodiment, the number of remote interface modules 212 and the number of controlled systems 206 are shown as being the same; however, these numbers need not be the same.) Control module 210 communicates with host computer 202 via Ethernet 207. Control module 210 communicates with each remote interface module 212a through 212n via a respective data channel 232. Each data channel 232 comprises one or more data links 233. (For simplicity and clarity, reference numerals are shown for data links 233 in only one data channel 232.) In some embodiments, the data channel 232 includes m data links 233 that are m-tuple redundant. As an illustrative embodiment, the data channels 232 are described as including two data links 233 that are dual redundant. In various embodiments, data channels 232 are implemented using CAT6 cable. In some embodiments, data channels 232 have a length up to 300 feet. This allows remote interface modules 212 to be located near a corresponding piece of equipment 206. Remote interface module 212 communicates with a corresponding piece of equipment 206 via cable 208. In some embodiments, cable 208 is less than 25 feet in length. Equipment 206 may provide to remote interface module 212 digital input (Din) signals that indicate states, status, or measurements of a system, sensor, or component of equipment 206. In various embodiments, control module 210 further communicates with each remote interface module 212 via a respective data channel 234, which may communicate digital, analog, or universal asynchronous receiver/transmitter (UART) signals.

Control module 210 comprises a configurable logic circuit module 240 that is programmable with the configuration equations to alter the interconnections and routing of signals and to provide a programmable interlock logic system. In various embodiments, control module 210 and each remote interface module 212 includes redundant configurable logic circuits that allow the interlocks to be reconfigured for interlock design changes of equipment 206, interlock conditions, or signal routing. Configurable logic circuit 240 includes a central processing unit (CPU) 244. Control module 210 also comprises a remote interface module (RIM) interface 242 that provides an interface between configurable logic circuit module 240 and remote interface modules 212.

Control module 210 uses a system clock (not shown) for timing throughout configurable I/O controller 204 and for signals provided to equipment 206. As will be described in more detail below, the system clock controls the timing of signals from configurable I/O controller 204 to equipment 206 such that the signal skew between any two output signals 208 on any combination of remote interface modules 212 is controlled within a threshold (e.g., 10 nanoseconds). In various embodiments, this control of timing of signals optimizes timing of control actions. In various embodiments, this control of timing of signals provides repeatability, synchronization and accuracy of control signals to tools 206.

Remote interface module 212 comprises an input/output module 250 and a field connect board 252. Input/output module 250 configures the routing of signals from control module 210 through remote interface module 212 to equipment 206. Input/output module 250 includes a plurality of input/output modules 257. In an illustrative embodiment, input/output module 250 includes up to 24 input/output modules 257a through 257x. (For simplicity and clarity, reference numerals are shown for only one remote interface module 212.) For convenience, "input/output module 257" is used interchangeably herein with "slot card 257". Slot cards 257 may be, for example, digital input/outputs, analog input/outputs, or universal asynchronous receiver/transmitters (UARTs). If adding more inputs/outputs is desired, another input/output module 250 may be added to one of the remote interface modules 212, and configurable logic circuit 240 is reconfigured accordingly. In an illustrative embodiment, slot card 257 is a module with a connector that is inserted into a slot connector on a board. Field connect board 252 is configured to connect signals 260 from input/output module 250 to the corresponding equipment 206. In some embodiments, the interconnections of field connect board 252 is specific for the configuration of equipment 206.

In various embodiments, configurable logic circuit 240 may be configured or reconfigured by the external programmer (not shown) coupled to configurable I/O controller 204 via Ethernet 207. If a mistake to the design of equipment 206 is made or equipment 206 is added or changed, configurable logic circuit 240 may be reconfigured by changing the configuration equations in the spreadsheet and reprogramming configurable logic circuit 240.

In various embodiments, a user of system 200 may design a product creation process (e.g., a process for manufacturing integrated circuit wafers) by designing, selecting and assembling equipment 206 for the process. The user determines the steps and the timing of the equipment 206 to be used in the process. Each piece of equipment 206 is set to a state at specified times based on specified conditions. For example, a gas may not be supplied to a chamber until an entry door is closed, an exit door is closed, and a gas valve is ready to be opened. The configuration equations include each state and the conditions for each piece of equipment 206 at all times. In order for each piece of equipment 206 to be set to the desired state at the desired time, configurable I/O controller 204 provides the appropriate signals to the appropriate equipment 206 based on received signals from host computer 202 and equipment 206 and interlock instructions. Configurable I/O controller 204 provides the signals by routing the signals to remote interface module 212 corresponding to the equipment 206. Configurable I/O controller 204 determines the routing from the configuration equations, which may be determined, for example, from a spreadsheet. The user of system 100 enters data into the spreadsheet to define the signals to be applied to equipment 206, the signal location in remote interface module 212 (e.g., connector and pin), and the interlock instructions. As described above, the programmer generates the configuration equations from the spreadsheet and programs configurable I/O controller 204 accordingly.

Configurable I/O controller 204 further includes a system status interface 280 coupled to CPU 244 for direct access to CPU 244 without Ethernet 207. In some embodiments, system status interface 280 is a bidirectional interface. In some embodiments, system status interface 280 allows access to configurable I/O controller 204 for diagnostics. In various embodiments, system status interface 280 provides access status of inputs and outputs to configurable I/O controller 204 and reading of configurable memory and other memory in configurable I/O controller 204, such as reading configuration equations.

Figure 3:
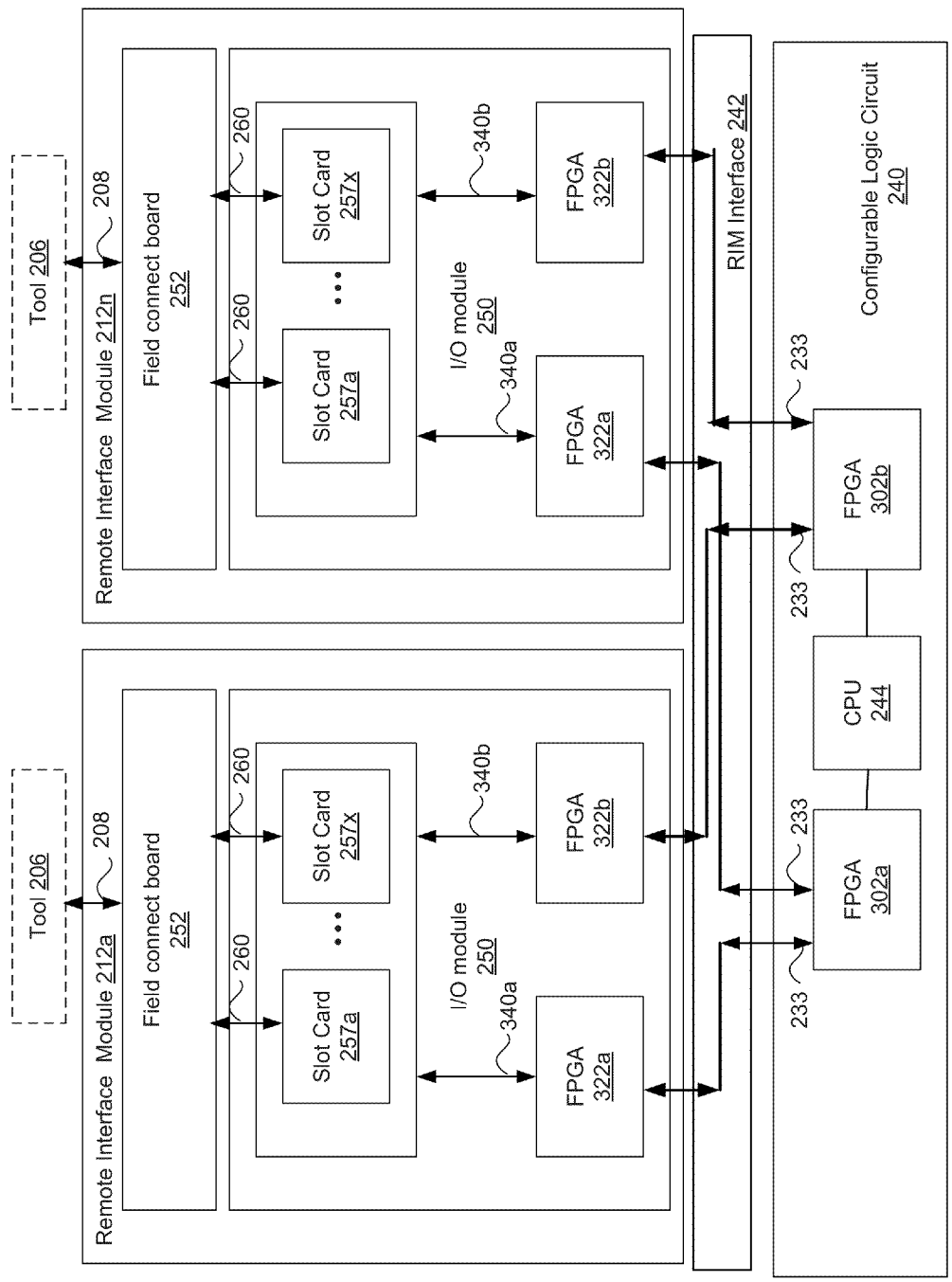
FIG. 3 is a block diagram illustrating a control module and remote interface modules of the input/output controller system of FIG. 2.

FIG. 3 is a block diagram illustrating configurable logic circuit 240, RIM interface module 242, and remote interface modules 212. Configurable logic circuit 240 comprises at least one configurable logic circuit 302. In an illustrative embodiment, two configurable logic circuits 302a and 302b are shown, but any number of configurable logic circuits 302 may be used. In an illustrative embodiment, configurable logic circuit 302 is a field programmable gate array (FPGA), and in the following description, "configurable logic circuit 302" is used interchangeably with "FPGA 302". In some embodiments, configurable logic circuit 302 is an application specific integrated circuit (ASIC).

Input/output module 250 includes at least one configurable logic circuit 322 and slot cards 257a through 257x. In an illustrative embodiment, two configurable logic circuits 322a and 322b are shown, but other numbers may be used. In an illustrative embodiment, configurable logic circuit 322 is a field programmable gate array (FPGA), and in the following description, "configurable logic circuit 322" is used interchangeably with "FPGA 322". In some embodiments, configurable logic circuit 322 is an application specific integrated circuit (ASIC).

FPGA 302 stores the configuration equations (such as those determined from the spreadsheet) to identify the constraints or dependencies for inputs (e.g., digital inputs) and for outputs (digital outputs and safety outputs) of FPGA 302. FPGA 302 functions as a configuration equation solver or resolver for executing the configuration equations. The configuration equations may also include controller system set up information of host computer 202.

FPGA 302 implements signal routing instructions and safety interlock logic instructions based on the configuration equations. FPGA 322 implements a subset of the signal routing instructions and the safety interlock logic instructions implemented by FPGA 302. In some embodiments, each FPGA 302 in a remote interface module 212 redundantly implements the signal routing instructions and the safety interlock logic instructions. In some embodiments, each FPGA 302 in a remote interface module 212 redundantly implements the subset of the signal routing instructions and the safety interlock logic instructions.

Remote interface modules 212 are configurable to selectively provide data signals to configurable logic circuit 240 and signals to equipment 206 based on signals received from configurable logic circuit 240 and equipment 206 and configuration equations stored in FPGA 322. In some embodiments, the configuration equations stored in FPGA 322 include multiplexer equations for configuring multiplexers (not shown) in remote interface module 212. FPGA 322 functions as a configuration equation solver or resolver for executing the configuration equations. In various embodiments, each FPGA 322 is coupled by one of the data links 233 to one of the FPGAs 302. For example, FPGA 322a is coupled to FPGA 302a by one data link 233 of a data channel 232, and FPGA 322b is coupled to FPGA 302b by another data link 233 of the data channel 232 as a redundant signal connection. In various embodiments, each FPGA 302 is coupled to a corresponding FPGA 322 of each remote interface module 212. In the illustrative example of FIG. 3, FPGA 302a is connected to FPGA 322a of each remote interface module 212a through 212n via a separate data link 233. Further, FPGA 302b is connected to FPGA 322b of each remote interface module 212a through 212n via a separate data link 233.

Figure 4:
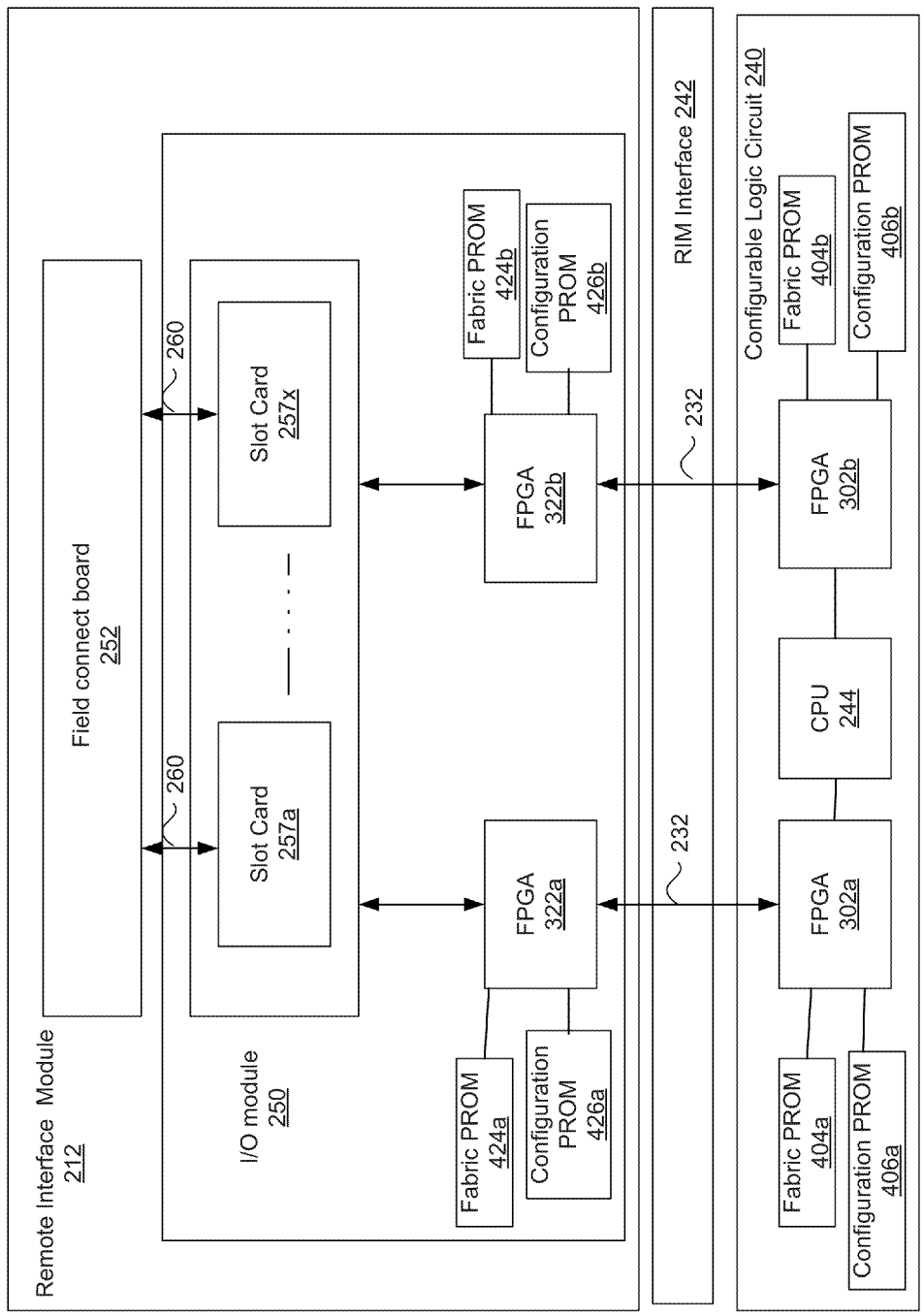
FIG. 4 is a block diagram illustrating a configurable logic circuit, a remote interface (RIM) interface module, and a remote interface module of the input/output controller system of FIG. 2.

FIG. 4 is a block diagram illustrating configurable logic circuit 240, RIM interface module 242, and remote interface module 212. Configurable logic circuit 240 comprises at least one fabric memory 404 and at least one configuration memory 406. In an illustrative embodiment, two fabric memories 404a and 404b, and two configuration memories 406a and 406b are shown, but any number of memories 404 and memories 406 may be used. In an illustrative embodiment, fabric memory 404 is a programmable read-only memory (PROM), and in the following description, "fabric memory 404" is used interchangeably with "fabric PROM 404". In an illustrative embodiment, configuration memory 406 is a programmable read-only memory (PROM), and in the following description, "configuration memory 406" is used interchangeably with "configuration PROM 406". In some embodiments, each FPGA 302 is coupled to a corresponding fabric PROM 404 and configuration PROM 406 to setup and configure FPGA 302. FPGA 302 implements signal routing instructions and safety interlock logic instructions based on configuration equations stored in configuration PROM 406.

Input/output module 250 comprises at least one fabric memory 424 and at least one configuration memory 426. In an illustrative embodiment, two fabric memories 424a and 424b and two configuration memories 426a and 426b are shown, but any number of memories 424 and memories 426 may be used. In an illustrative embodiment, fabric memory 424 is a programmable read-only memory (PROM), and in the following description, "fabric memory 424" is used interchangeably with "fabric PROM 424". In an illustrative embodiment, configuration memory 426 is a programmable read-only memory (PROM), and in the following description, "configuration memory 426" is used interchangeably with "configuration PROM 426". In some embodiments, configuration PROM 426 includes part identifiers, such as part numbers.

In various embodiments, FPGA 302 includes a volatile memory for storing information that is lost at power off. At each power-up, FPGA 302 loads fabric PROM 404 and reads configuration PROM 406.

Fabric memory 404 stores the "fabric" that is used to organize the internal logic within FPGA 302 at power up of control module 210. Fabric memory 424 stores the "fabric" that is used to organize the internal logic within FPGA 322 at power up of remote interface module 212.

Configuration PROM 406 stores the configuration equations and provides the signal routing and the safety interlock logic instructions to FPGA 302. Configuration PROM 406 is programmed by the external programmer (not shown) using, for example, the spreadsheet including the configuration equations. In some embodiments, configuration PROM 426 stores the configuration equations and provides the signal routing and the safety interlock logic instructions to FPGA 332. Configuration PROM 426 is programmed by the external programmer (not shown) using, for example, the spreadsheet including the configuration equations.

Figure 5:
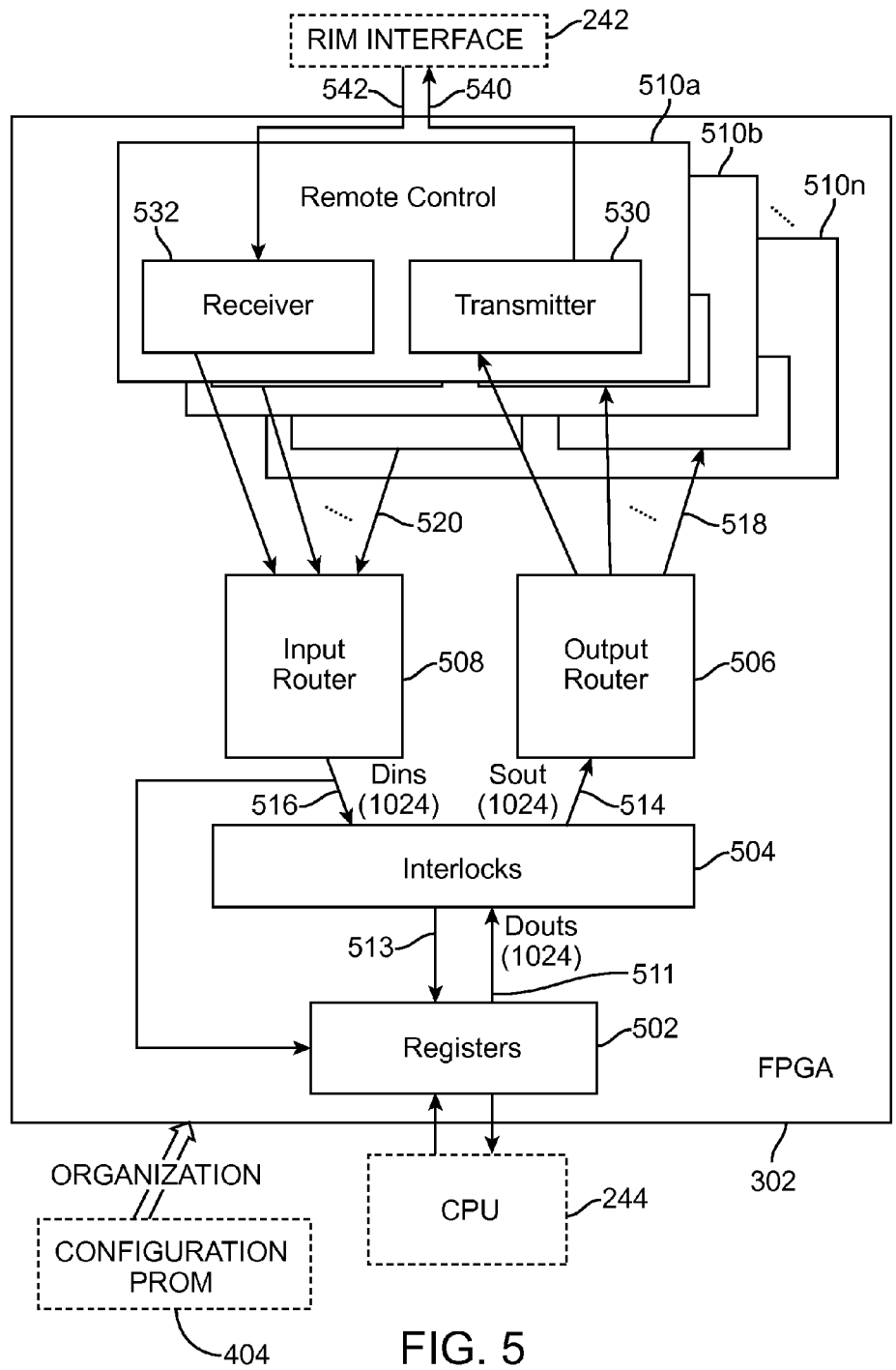
FIG. 5 is a block diagram illustrating a configurable logic circuit of the control module of FIG. 3.

FIG. 5 is a block diagram illustrating FPGA 302 as organized by the configuration in fabric PROM 404. FPGA 302 comprises a register circuit 502, an interlock circuit 504, an output router 506, an input router 508, and a plurality of remote control modules 510a through 510n.

Register circuit 502 receives data and control signals from CPU 244, and provides data signals 511 to interlock circuit 504 and receives data signals 513 from interlock circuit 513. In an illustrative embodiment, data signals 511 include digital output (Dout) signals, which may number up to 1,024 signals. For convenience, "data signal 511" is used interchangeably herein with "digital output signal 511".

Interlock circuit 504 is configured by configuration equations provided by configuration PROM 406. Interlock circuit 504 provides output signals 514 to output router 506 based on the configuration equations and input signals 516 from input router 508. In an illustrative embodiment, output signals 514 include safety digital output (S out) signals, which may number up to 1,024 signals. For convenience, "output signal 514" is used interchangeably herein with "safety output signal 514". In an illustrative embodiment, input signals 516 include digital input (DIN) signals, which may number up to 1,024 signals. For convenience, "input signal 516" is used interchangeably herein with "digital input signal 516". If the interlock circuit 504 receives a digital input signal 516 from input router 508, interlock circuit 504 converts it to an appropriate signal and sends it to register circuit 502. Interlock circuit 504 functions as a configuration equation resolver for executing the configuration equations.

Output router 506 routes safety output signals 514 as output signals 518 to remote control modules 510 based on the routing of the configuration equations.

Input router 508 routes input signals 520 from remote control modules 510 to interlock circuit 504 and registers 502 as digital input signals 516.

Remote control module 510 comprises a transmitter 530 and a receiver 532. Transmitter 530 provides data and control signals 540 to remote interface module interface 242 for communication to remote interface module 212 based on output signals 518 from output router 506. In various embodiments, signals 540 include safety digital output signals. Receiver 532 provides input signals 520 to input router 508 for communication to interlock circuit 504 based on input signals 542 from remote interface module 212 via remote interface module interface 242. In some embodiments, each remote control module 510 communicates only with one corresponding remote interface module 212. In some embodiments, the number of remote control modules 510 equals the number of remote interface modules 212.

A functional flow from host computer 202 to equipment 206 is described. Host computer 202 generates commands from graphical user interface (GUI) software running on host computer 202 that is sent through Ethernet 207 to CPU 244. CPU 244 in turn sends the signal to register circuit 502 in FPGA 302, which converts the signal to digital output signal 511 (e.g., digital output Dout 1 of the 1,024 signals). The digital output signal 511 is provided to the interlock circuit 504, where the signal 511 is converted to signal 514 (e.g., safety output Sout 1 of the 1,024 signals) and sent to output router 506. Output router 506 knows where in system 100 that this specific Sout signal 514 is going and sends it to the correct remote control module 510 (1 of 16) within FPGA 302. Remote control module 510 sends safety output signal 514 to the corresponding FPGA 322 on remote interface module 212. Remote interface module 212 provides the safety output signal 514 through the appropriate slot card 257 and field connect board 252 to the designated tool or component in equipment 206.

A functional flow from equipment 206 to CPU 244 is described. A tool or component (e.g., sensor or door latch on the chamber) of equipment 206 generates a signal and sends the signal to its corresponding connector on the field connect board 252 where it goes to the corresponding slot card 257 on remote interface module 212. The board connected to slot 324 converts the signal from its format (sensor or the like) to a digital input (Din) signal where it is sent to FPGA 322 on remote interface module 212. FPGA 322 sends the Din signal as signal 542 to the corresponding receiver 532 in remote control module 510 of FPGA 302. Receiver 532 sends the signal 542 as signal 520 to input router 508. Input router 508 sends digital input signals 516 to interlock circuit 504 and to registers 502.

Figure 6:
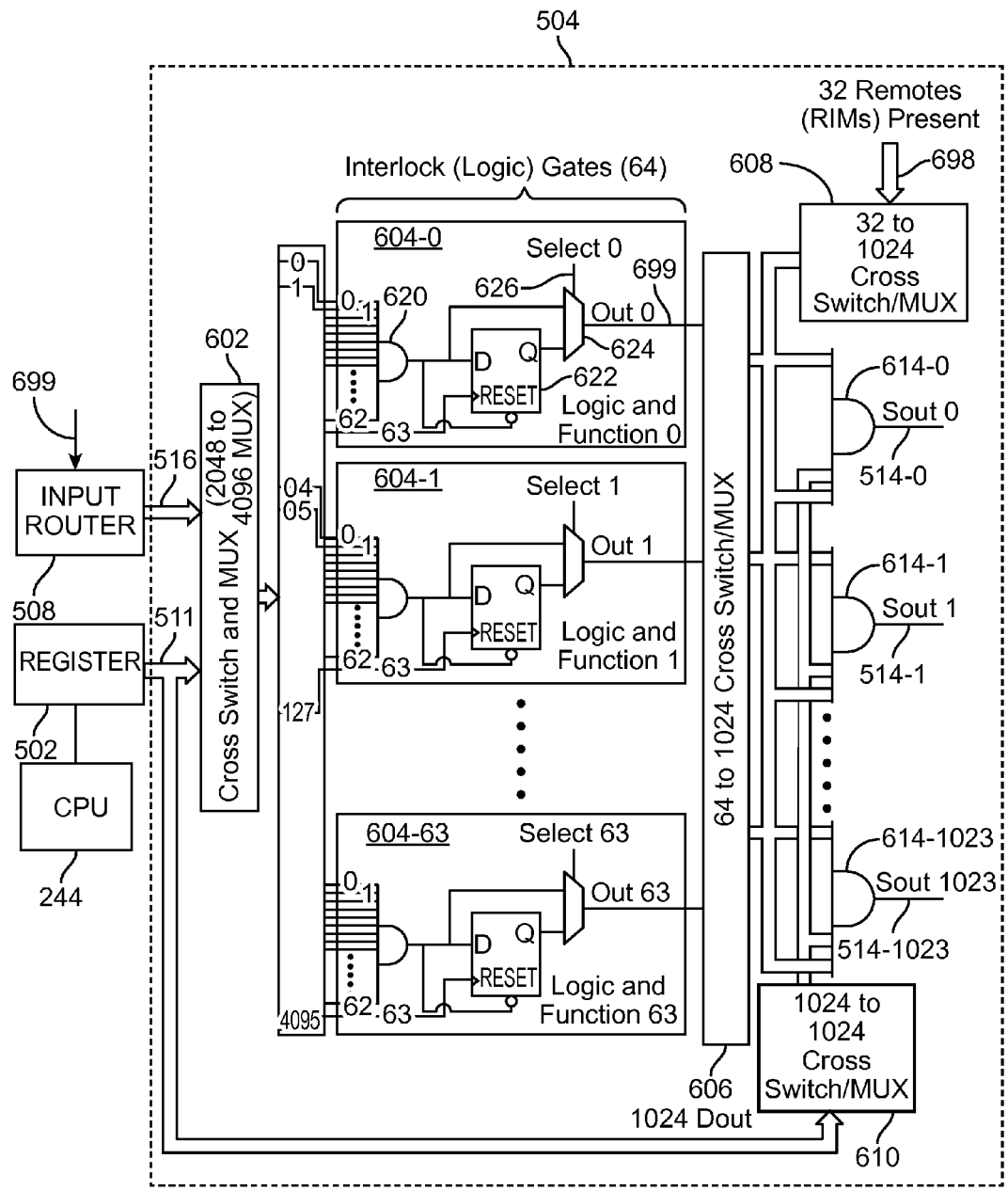
FIG. 6 is a block diagram illustrating an interlock circuit of the configurable logic circuit of FIG. 5.

FIG. 6 is a block diagram illustrating interlock circuit 504. Interlock circuit 504 provides digital output signals in response to a large number of digital inputs, digital outputs, and selection signals for remote interface modules 212. In an illustrative embodiment, interlock circuit 504 may receive 1,024 digital inputs signals 516, 1,024 digital output signals 511 and 32 RIM present signals 698 for 32 remote interface modules 212. Based on the configuration equations, interlock circuit 504 sets multiplexers and logic circuits therein to generate 1,024 output signals 514.

Interlock circuit 504 comprises an input multiplexer 602, a plurality of interface logic circuits 604-0 through 604-63, a plurality of output multiplexers 606, 608, and 610, and a plurality of AND gates 614. The configuration equations stored in configuration PROM 406 may also include multiplexer equations for any of multiplexers 602, 606, 608 and 610.

Multiplexer 602 is an input multiplexer of interlock circuit 504, and may also include a cross switch. In an illustrative embodiment, multiplexer 602 includes a 2,048 to 4,096 multiplexer or cross switch or combination of both. Multiplexer 602 receives digital input signals 516 from input router 508 and digital output signals 511 from registers 502. Interface logic circuits 604 provide interlock output signals 699 to cross switch 606.

Control module 210 is reconfigurable to accommodate permutations of connections to remote interface module 212 via multiplexers 602, 606, 608 and 610 based on changes to the interlock equations or the multiplexer equations or both.

Interlock circuit 604 generates interlock signals based on the programming of the configuration equations, and the inputs provided thereto by multiplexer 602. In an illustrative embodiment, interlock circuit 604 comprises interlock circuit 604-0 through interlock circuit 604-63. Interlock circuit 604 comprises an AND gate 620, a D-flip-flop 622 and a multiplexer 624. For simplicity and clarity, reference numerals are shown only for one interlock circuit 604, namely interlock circuit 604-0. Multiplexer 624 outputs either the output of AND gate 620 or the delayed output of AND gate 620 from D-flip-flop 622 in response to a selection signal 626 from configuration PROM 406. In an illustrative embodiment, interlock circuit 604 includes an AND gate 620 with 64 inputs. Multiplexer 602 provides the digital input signals 516 and digital output signals 511 to the AND gates 620. Each of digital input signals 516 and digital output signals 511 has up to 1,024 different signals. Multiplexer 602 may provide digital input signals 516 and digital output signals 511 in any combination to an AND gate 620.

Multiplexer 606 is an output multiplexer of interlock circuit 504, and may also include a cross switch. In an illustrative embodiment, multiplexer 606 includes a 64 to 1,024 multiplexer or cross switch or combination of both.

Multiplexer 608 is an output multiplexer of interlock circuit 504, and may also include a cross switch. In an illustrative embodiment, multiplexer 608 includes a 32 to 1,024 multiplexer or cross switch or combination of both. In response to the RIM present signal 698, multiplexer 608 provides an enable signal to AND gates 614.

Multiplexer 610 is an output multiplexer of interlock circuit 504, and may also include a cross switch. In an illustrative embodiment, multiplexer 610 includes a 1,024 to 1,024 multiplexer or cross switch or combination of both. Multiplexer 610 applies digital output signals 511 to AND gates 614.

AND gates 614-0 through 614-1023 provide digital output signals 514-0 through 514-1023, respectively, in response to the combination of selected signals from output multiplexer 608, output multiplexer 610, and interlock circuits 604. Although 1,024 AND gates 514 are shown, other numbers may be used.

Using the configuration equations, digital output signal 699 from interlock logic gate 604 is applied to the inputs of interlock multiplexer 606. In the illustrative example of FIG. 7, the six input bus lines of interlock multiplexer 606 correspond to the 64 ($2^6$) interlock logic gates 604. RIM present signals 698 are applied to the inputs of RIM multiplexer 608. In the illustrative example of FIG. 7, the five input bus lines of RIM multiplexer 608 correspond to the 32 ($2^5$) remote interface modules 212. Digital output signals 511 from registers 402 are applied to the inputs of digital output multiplexer 610. In the illustrative example of FIG. 7, the ten input bus lines of digital output multiplexer 610 correspond to the 1,024 ($2^{10}$) digital output signals 511. The outputs of interlock multiplexer 606, remote interface module (RIM) multiplexer 608, and digital output multiplexer 610 are applied to respective inputs of AND gate 614, which generates the safety output signal 514.

Figure 7:
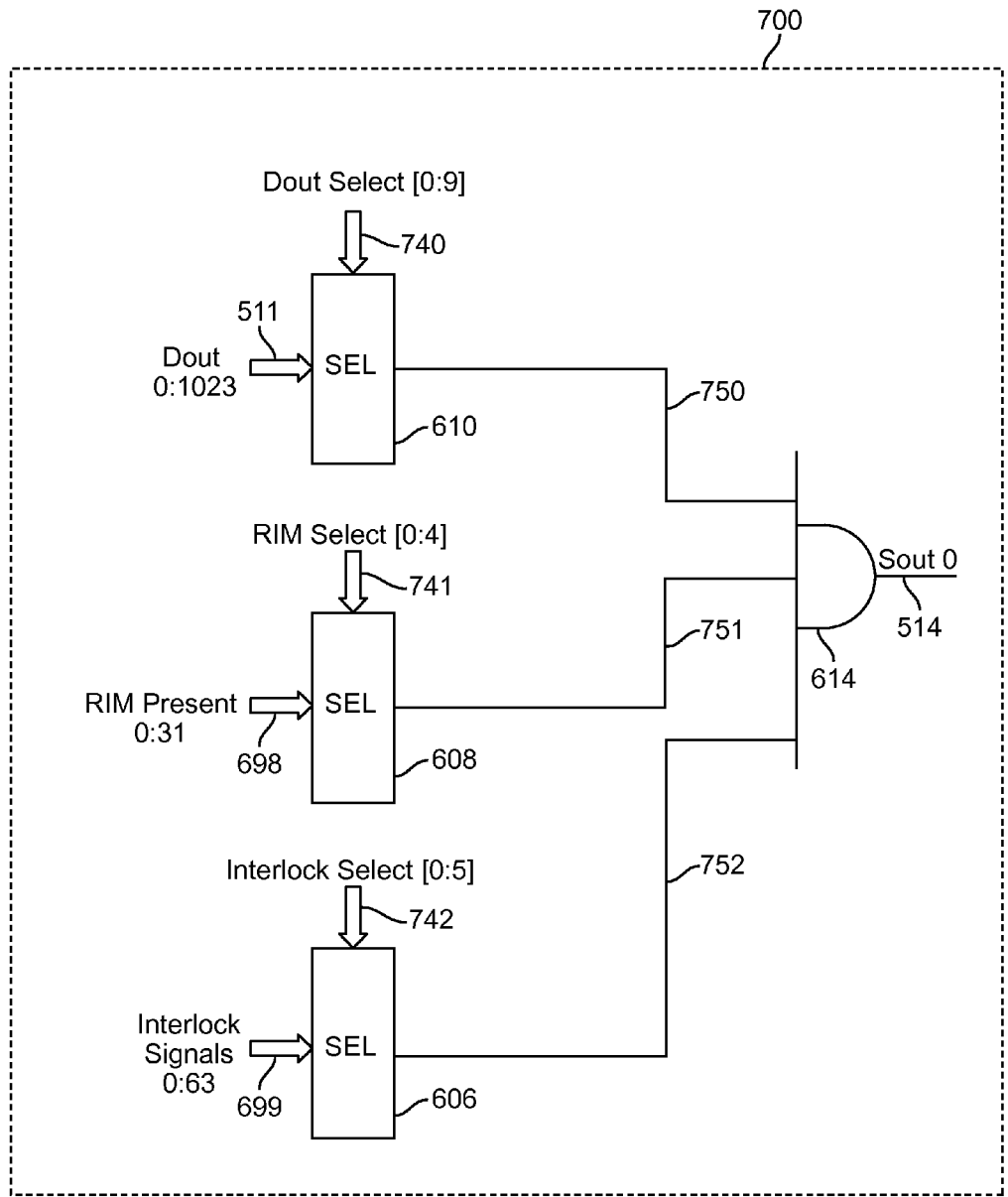
FIG. 7 is a block diagram illustrating a simplified block diagram of an interlock circuit that is a portion of interlock circuit of FIG. 6.

FIG. 7 is a block diagram illustrating an interlock circuit 700 that is a portion of interlock circuit 504 of FIG. 6 as an illustration of how safety output signals 514 are generated. Interlock circuit 700 comprises multiplexers 606, 608, 610 and AND gate 614. Interlock output signals 699 are applied to the 64 input lines of interlock multiplexer 606. An interlock selection signal 742 determines which interlock output signal 699 that multiplexer 6096 applies as interlock signal 752 to AND gate 614. RIM present signals 698 are applied to the 32 input lines of RIM multiplexer 608. A RIM selection signal 741 determines which RIM Present signal 698 that multiplexer 608 applies a RIM present signal 751 to AND gate 614. Digital output signals 511 are applied to the 1,024 input lines of multiplexer 610. A digital output selection signal 740 determines which digital output signal 511 that multiplexer 610 applies as digital output signal 750 to AND gate 614. In response to digital output signal 511, RIM present signal 698, and interlock output signal 699, AND gate 614 generates digital output signal 514. The configuration equations may include associations between digital output select signal 740, remote interface (RIM) select signal 741, and interlock select signal 742. The above described spreadsheet includes these associations. A portion of the spreadsheet may include an output interlock lookup table, such as the table of FIG. 9.

Referring again to FIG. 6, for a 4,096 output multiplexer 602, multiplexer 602 may route 2,048 inputs to the 64 AND gates 620 having 64 inputs each. The configuration equations may route some logic input signals (signals 511 and 516) to multiple inputs of the AND gates 620. The above described spreadsheet includes these associations. A portion of the spreadsheet may include an input configuration lookup table, such as the table of FIG. 8.

FIG. 8 is a diagram illustrating an input configuration lookup table for interlock circuit 404, which resides in a configuration PROM 406. The table includes the digital input signals 516, the digital output signals 511, and the associated interlocks.

Referring again to FIG. 6, the safety output signals 514 are determined by the three inputs to each AND gate 614 from the multiplexers 606 and 610 and the interlock circuit 604. The routing of these inputs, and the selection of the multiplexers 602, 606, 608 and 610 is determined by the configuration equations stored in configuration PROM 406. The configuration equations associate the safety output signals 514 with digital input signals 516, digital output signals 511, and the feedback of digital output signal 699 from interlock logic gates 604. The above described spreadsheet includes these associations. A portion of the spreadsheet may include an output interlock lookup table, such as the table of FIG. 9.

FIG. 9 is a diagram illustrating an output interlock lookup table for interlock circuit 604. The output interlock lookup table lists safety output signals 514, digital output select signal 740, remote interface (RIM) select signal 741, and interlock select signal 742.

Figure 10:
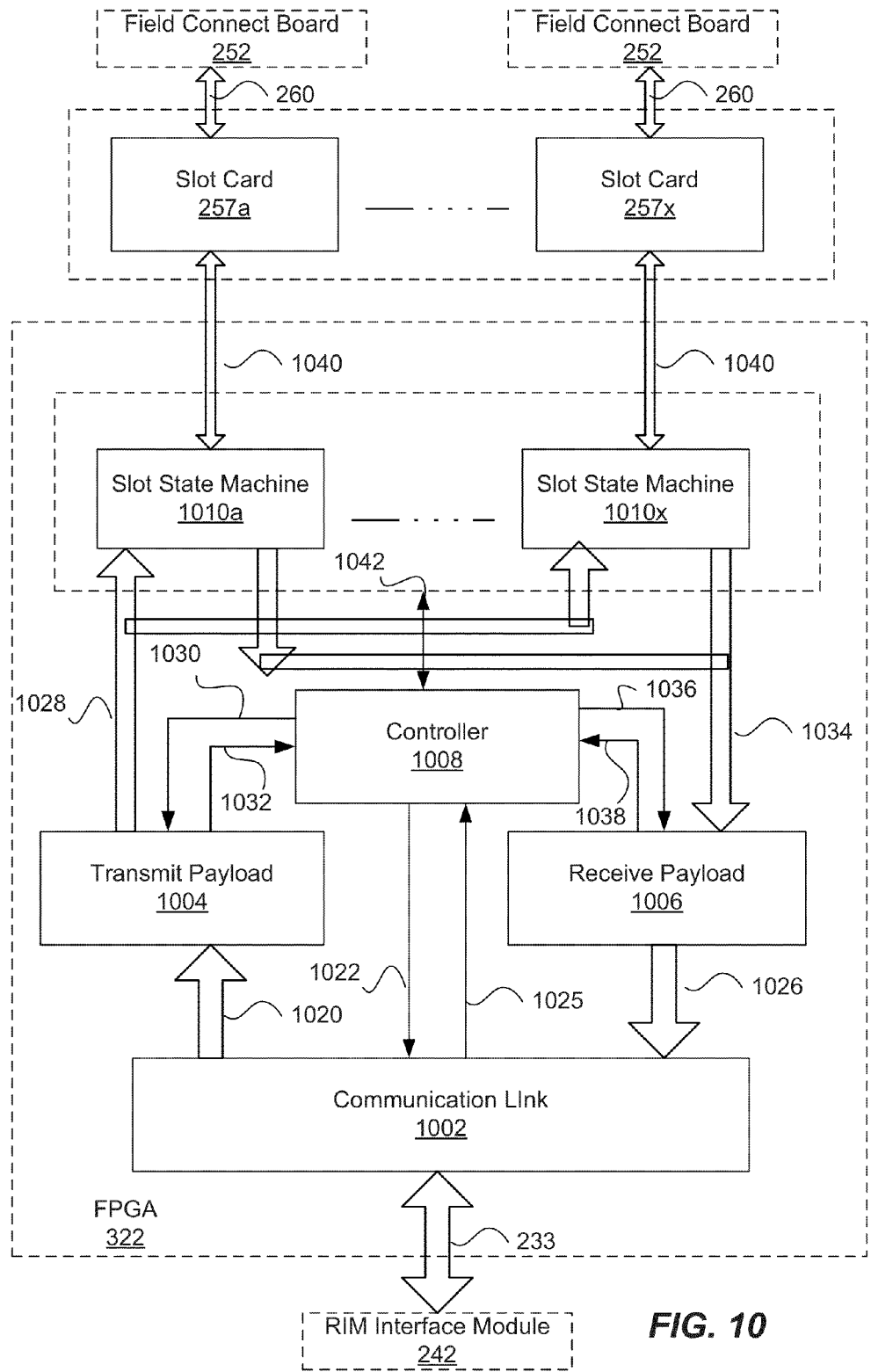
FIG. 10 is a block diagram illustrating a configurable logic circuit of the remote interface module of FIG. 3.

FIG. 10 is a block diagram illustrating FPGA 322. FPGA 322 comprises a communication link circuit 1002, a transmit payload memory 1004, a receive payload memory 1006, a controller 1008, and a plurality of slot state machines 1010a through 1010n.

Communication link circuit 1002 communicates data and control signals with control module 210 via data link 233. Communication link circuit 1002 provides transmit data 1020 for storage in transmit payload memory 1004 in response to a communication link control signal 1022 from controller 1008. Communication link circuit 1002 provides a communication link status signal 1025 to controller 1008 to convey status of communication link circuit 1002. Communication link circuit 1002 receives received data 1026 from receive payload memory 1006.

Transmit payload memory 1004 provides transmit data 1028 to selected slot state machines 1010 in response to a transmit control signal 1030 from controller 1008. Transmit payload memory 1004 provides a transmit payload memory status signal 1032 to controller 1008 to convey status of transmit payload memory 1004. In various embodiments, FPGA 322 includes a plurality of transmit payload memories 1004 where each memory 1004 is coupled to a corresponding slot state machine 1010.

Receive payload memory 1006 stores receive data 1034 from slot state machines 1010 in response to a receive control signal 1036 from controller 1008. Receive payload memory 1006 provides a receive payload memory status signal 1038 to controller 1008. Receive payload memory 1006 provides received data 1026 to communication link circuit 1002. In various embodiments, FPGA 322 includes a plurality of receive payload memories 1006 where each memory 1006 is coupled to a corresponding slot state machine 1010.

Slot state machine 1010 is an interface between FPGA 332 and slot cards 257. Slot state machine 1010 routes signals from transmit payload memory 1004 to slot cards 257 via signals 1040 and signals from slot cards 257 via signals 1040 to receive payload memory 1006 in response to a slot state machine control signal 1042 from controller 1008. In some embodiments, the number of slot state machines 1010 equals the number of slot cards 257. In some embodiments, each slot state machines 1010a through 1010n communicates only with slot card 257a through 257x, respectively. Slot cards 257 communicate with field connect board 252 via signals 260.

Controller 1008 controls the flow of data into, through, and out of FPGA 322, and communicates status of FPGA 322 via communication link 1002 to FPGA 302.

A functional flow from host computer 202 to equipment 206 is described. Host computer 202 generates commands from graphical user interface (GUI) software running on host computer 202 that is sent through Ethernet 207 to CPU 244. CPU 244 in turn sends the signal to FPGA 302. The functional flow through FPGA 302 is described above in conjunction with FIG. 5. FPGA 302 provides the signal to FPGA 322 via data link 233. Communication link circuit 1002 receives the signal from FPGA 302 and stores the data in transmit payload memory 1004. Transmit payload memory 1004 provides the data to selected slot state machines 1010 in response to the transmit control signal 1030 from controller 1008. The selected slot state machines 1010 send the data via signal 1040 to the slot card 257 corresponding to the selected slot state machines 1010 for transmission via signal 260 to field connect board 252 and then via signal 208 to the designated tool or component in equipment 206.

A functional flow from equipment 206 to CPU 244 is described. A tool or component (e.g., sensor or door latch on the chamber) of equipment 206 sends signal 208 to its corresponding connector on the field connect board 252 where it goes to the corresponding slot card 257 on remote interface module 212. Slot card 257 converts the signal from its format (sensor or the like) to digital and provides signal 1040 to slot state machine 1010. In response to slot state machine control signal 1042 from controller 1008, slot state machine 1010 sends receive data 1034 to receive payload memory 1006, which in turn sends received data 1026 to communication link circuit 1002. Communication link circuit 1002 sends the data via data link 233 to FPGA 302, and then to CPU 244. The functional flow through FPGA 302 to CPU 244 is described above in conjunction with FIG. 4.

Figure 11:
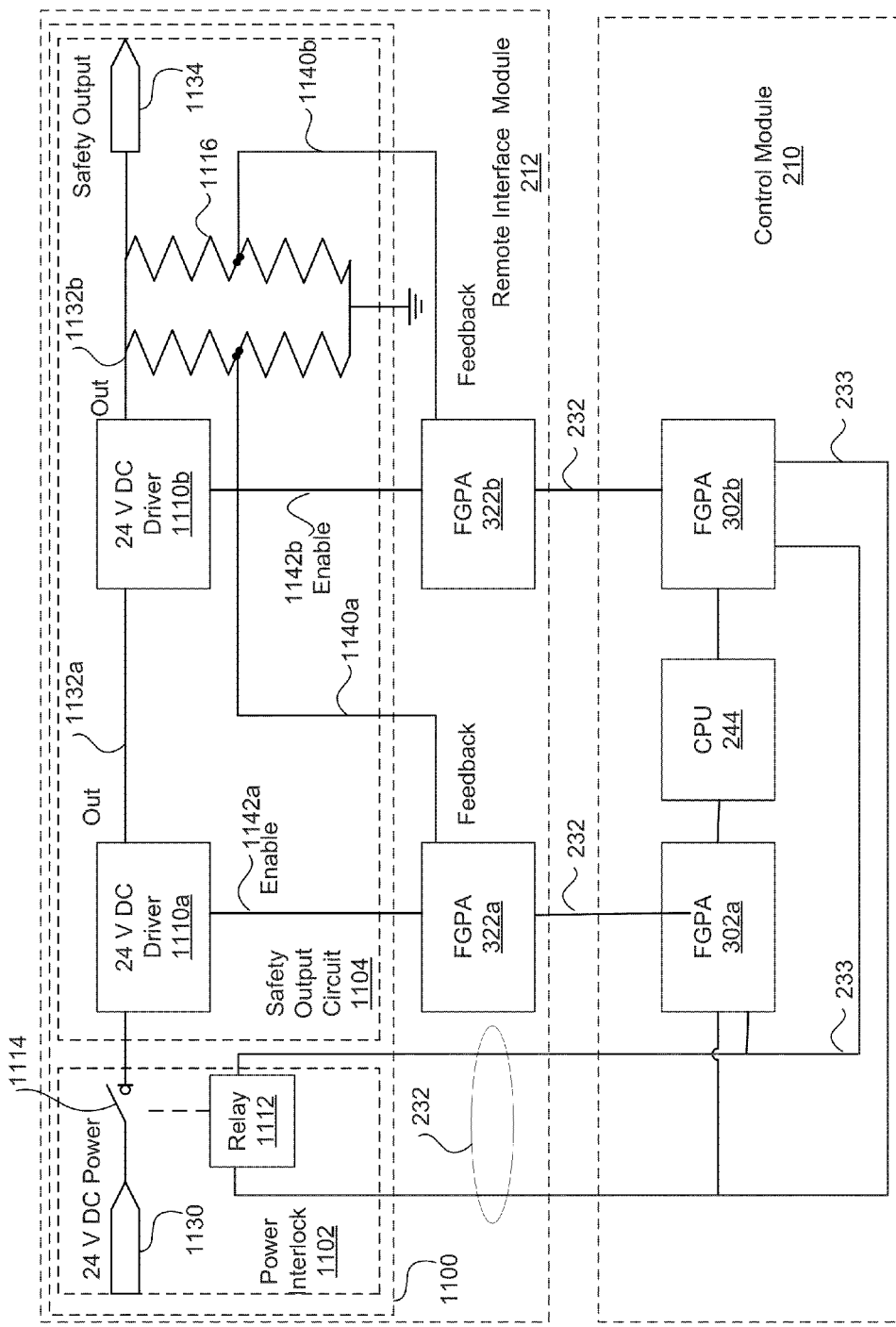
FIG. 11 is a block diagram illustrating a power interlock system of input/output controller system of FIG. 2.

FIG. 11 is a block diagram illustrating a power interlock system 1100. Power interlock system 1100 provides a safety output enable signal 1134 if power is enabled to allow remote interface module 212 to generate safety output signals 514 and provide safety output signal 514 to equipment 206. In various embodiments, each remote interface module 212 includes a power interlock circuit 1100. Power interlock system 1100 comprises a power interlock circuit 1102 and a plurality of safety output circuits 1104. For simplicity and clarity, one safety output circuit 1104 is shown; however, each remote interface module 212 may have a safety output circuit 1104 for each safety output signal 514 generated by the remote interface module 212. Power interlock circuit 1102 comprises a relay 1112, a switch 1114. Safety output circuit 1104 comprises a plurality of DC voltage drivers 1110, and a feedback circuit 1116.

Power interlock system 1100 receives a power signal 1130 (e.g., a 24 volt DC signal) that, when switch 1114 is closed, is applied to DC voltage drivers 1110 of each safety output circuit 1104 and other elements of remote interface module 212, and when switch 1114 is open, is removed from being applied to DC voltage drivers 1110 of each safety output circuit 1104 and other elements of remote interface module 212. For simplicity and clarity, switch 1114 is shown separate from relay 1112; however, switch 1114 may be part of relay 1112. Relay 1112 includes the circuits for actuation to open and close switch 1114. In various embodiments, relay 1112 and switch 1114 comprise electromechanical relays and switches. In an illustrative embodiment, safety output circuit 1104 includes DC voltage drivers 1110a and 1110b that provide output voltages 1132a and 1132b, respectively, to both feedback circuit 1116 and safety output enable signal 1134.

Feedback circuit 1116 provides feedback signals 1140a and 1140b to FPGAs 322a and 322b, respectively, to indicate whether output voltages 1132a and 1132b, respectively, are present. In some embodiments, feedback circuit 1116 comprises a plurality of voltage dividers.

FPGAs 322a and 322b provide enable signals 1142a and 1142b, respectively, to DC voltage drivers 1110a and 1110b, respectively, to enable drivers 1110 if power is to be provided to safety output signals 514 and feedback signals 1140 are within appropriate levels. As noted above, one safety output circuit 1104 is shown. FPGA 322 provides an enable signal 1142 to each safety output circuit 1104 and receives a feedback signal 1140 from each safety output circuit 1104.

FPGAs 302a and 302b provide control signals via data links 233 of one data channel 232 to relay 1112 to close switch 1114 to apply power to safety output enable signal 1134 or to open switch 1114 to remove power from safety output enable signal 1134. FPGAs 302a and 302b communicate via other data channels 232 with FPGAs 322a and 322b, respectively, to instruct the FPGAs 322 to enable or disable DC voltage drivers 1110. FPGAs 302 communicate with CPU 244 to provide digital signals, which may include power status of power interlock circuit 1100, to CPU 244.

Figure 12:
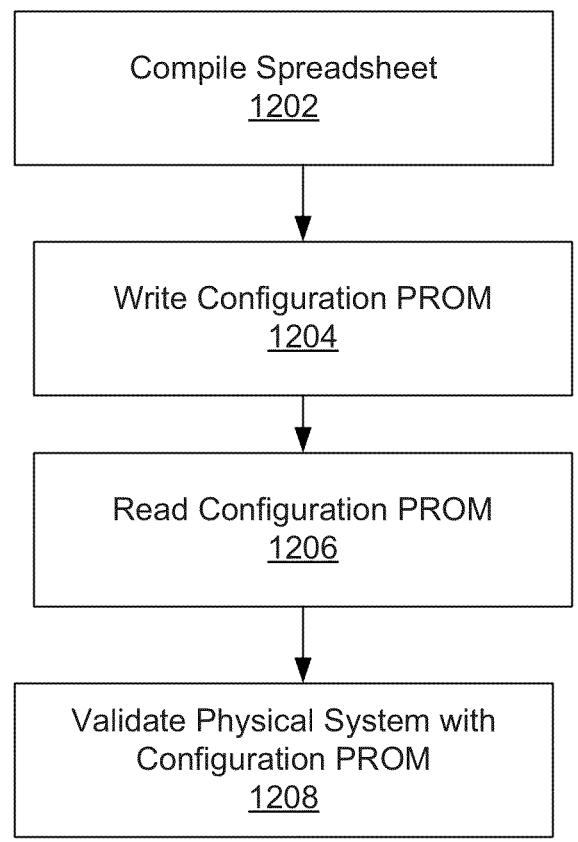
FIG. 12 illustrates a process for configuring the input/output controller system of FIG. 2 at a first initialization.

FIG. 12 illustrates a process for configuring input/output controller system 200 at a first initialization. At 1202, the external programmer (not shown) compiles the spreadsheet. At 1204, the external programmer writes the configuration equations into configuration PROM 406. At 1206, the external programmer reads configuration PROM 406. At 1208, the external programmer validates the physical system (e.g., remote interface modules 212) with configuration PROM 406.

Figure 13:
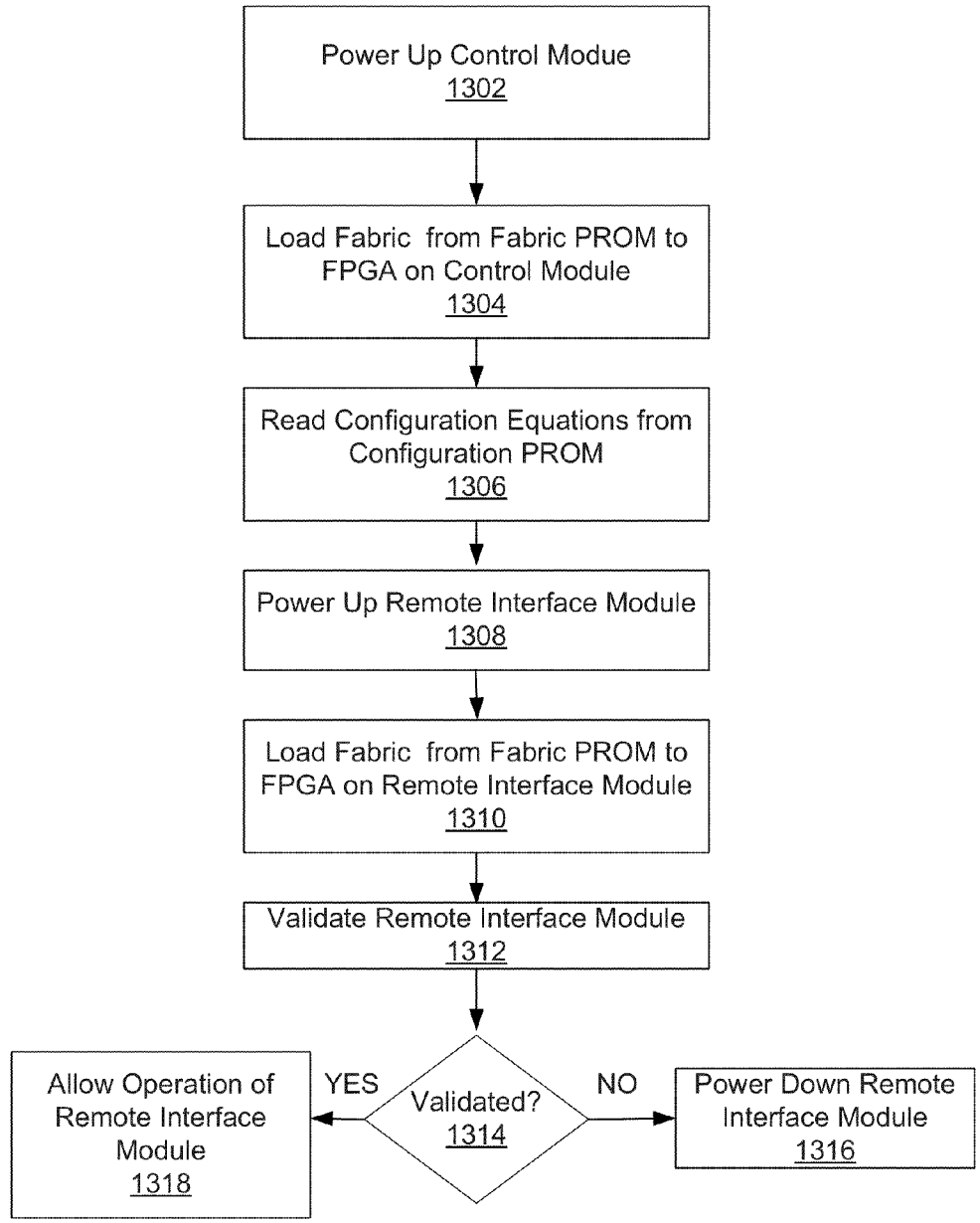
FIG. 13 illustrates a process for configuring the input/output controller system of FIG. 2 at power up.

FIG. 13 illustrates a process for configuring input/output controller system 200 at power up. At 1302, power is applied to system 200 to turn on control module 210. At 1304, FPGA 302 loads the fabric from fabric PROM 404. At 1306, FPGA 302 reads the configuration equations from configuration PROM 406. At 1308, control module 210 powers up remote interface modules 212. The following process is performed for each remote interface module 212. At 1310, FPGAs 322 loads the fabric from fabric PROM 424. At 1312, FPGA 302 validates the remote interface module 212 and module configuration. At 1314, if the remote interface module 212 is not validated, FPGA 302 removes power to the remote interface module 212 using power interlock system 1100 (FIG. 11). Otherwise, at 1314, if the remote interface module 212 is validated, FPGA 302 allows operation of remote interface module 212.

Figure 14:
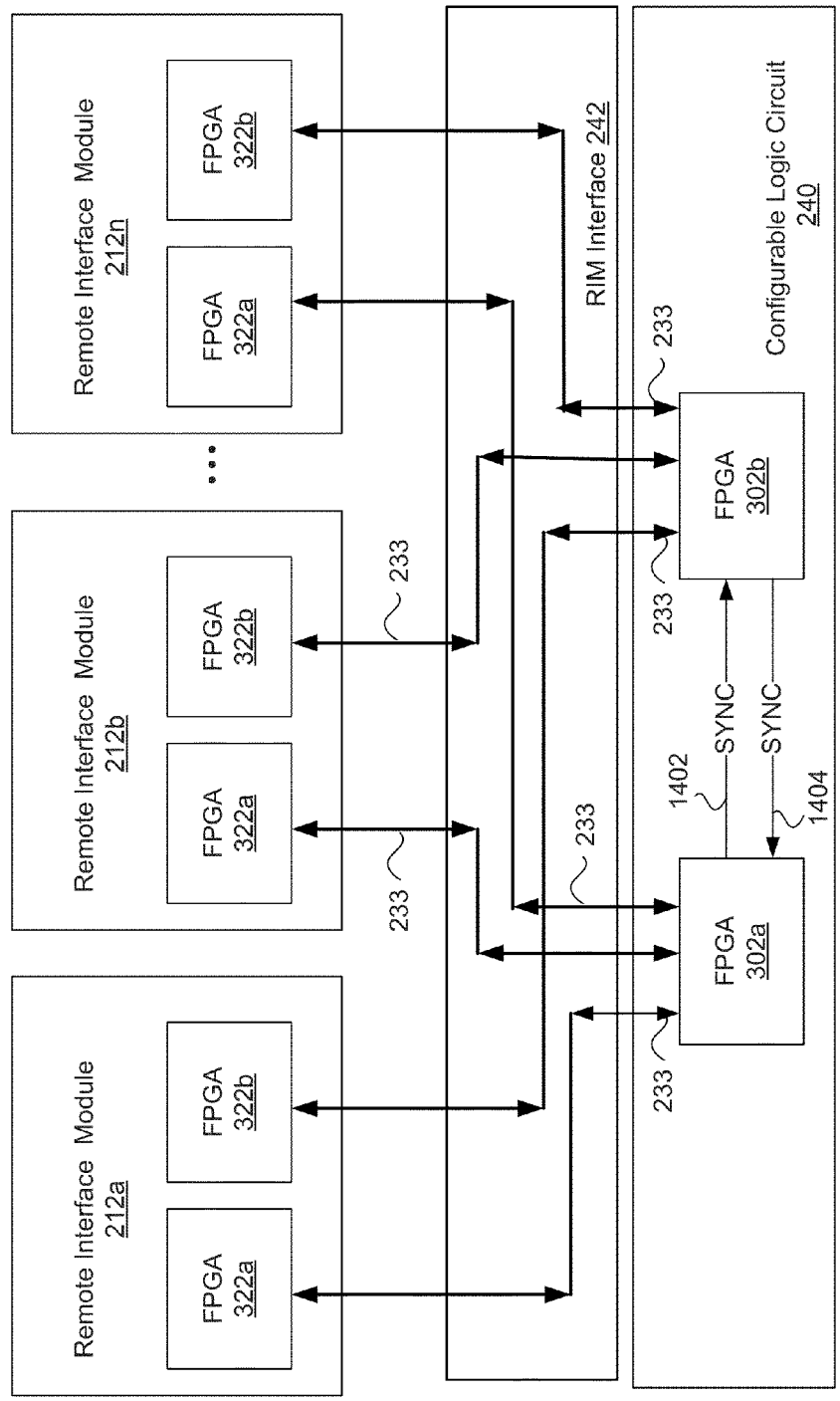
FIG. 14 is a block diagram illustrating the configurable logic circuits of the input/output controller system of FIG. 2.

FIG. 14 is a block diagram illustrating FGPAs 302 and FPGAs 322 for synchronizing timing. FPGA 302a provides a synchronization signal 1402 to FPGA 302b. In response, FPGA 302b provides a synchronization signal 1404 to FPGA 302a. FPGA 302a adjusts synchronization signal 1402 and the process continues until FGPA 302a and FPGA 302b are synchronized to each other. In some embodiments, each FPGA 302 includes a clock oscillator (not shown). Each FPGA 302 operates to provide signals 233 to remote interface modules 212 so that each remote interface module 212 receives signals 233 at known times. In various embodiments, FPGA 302 operates on a timing based on a frame (e.g., 125 microsecond frame).

FIG. 15 illustrates a diagram of a data packet 1500, which comprise a header 1502, an acknowledgement field 1503, a data field 1504, and a checksum 1506. FPGA 302a transmits data packet 1500 to each FPGA 322a.

Referring again to FIG. 14, each FPGA 322a sends to FPGA 302a a data packet 1500 with acknowledgement field 1503 set to acknowledge receipt by FPGA 322a of data packet 1500 from FPGA 302a.

FIG. 16 illustrates a diagram of commit packet 1600, which comprise a header 1602, an acknowledgement field 1603, a "delta time to commit" data 1604, and a checksum 1606. "Delta time to commit" data 1604 defines the time for FPGA 322 to perform input/output operations. FPGA 302a sends commit packet 1600 to each FPGA 322a.

Referring again to FIG. 14, each FPGA 322a sends to FPGA 302a a data packet 1500 with acknowledgement field 1503 set to acknowledge receipt by FPGA 322a of commit packet 1600 from FPGA 302a. FPGA 302b and each FPGA 322b operate in a similar manner as FPGA 302a and FPGAs 322a.

Figure 17:
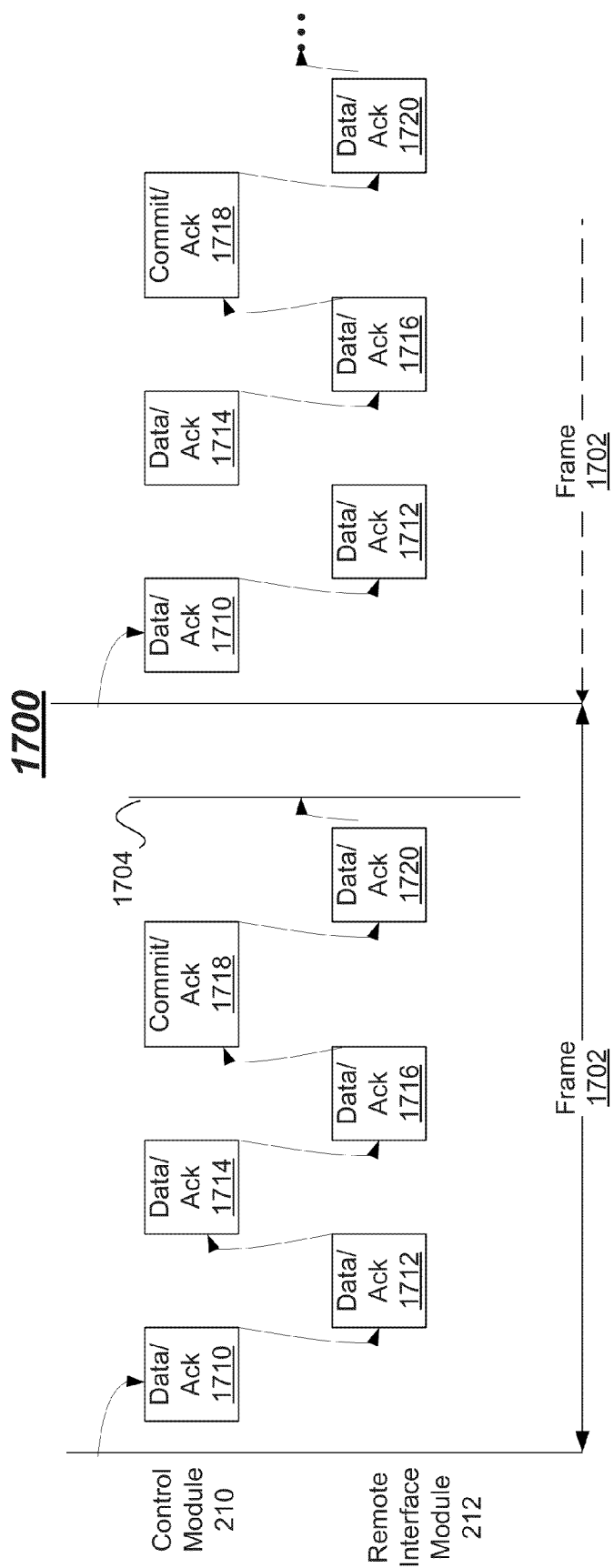
FIG. 17 illustrates a timing diagram for the configurable logic circuits of FIG. 14.

FIG. 17 illustrates a timing diagram for the data packets 1500 and commit packets 1600. During a frame 1702, FPGA 302a sends data packet 1500 (e.g., a data packet 1710) to FPGA 322a. In response, FPGA 322a sends a data packet 1500 (e.g., a data packet 1712) with an acknowledgement of receipt to FPGA 302a. For the sake of illustration, FPGA 302a sends another data packet 1500 (e.g., a data packet 1714) to FPGA 322a, and in response, FPGA 322a sends another data packet 1500 (e.g., a data packet 1716) with an acknowledgement of receipt to FPGA 302a. Depending on size of data packets 1500 and whether FPGA 322a correctly receives the data packets 1500, any number and types of data packets 1500 may be transmitted. FPGA 302a sends a commit packet 1600 (e.g., a commit packet 1718) to FPGA 322a. In response FPGA 322a sends a data packet 1500 (e.g., data packet 1720) with an acknowledgement of receipt to FPGA 302a. In various embodiments, data packet 1720 is sent by a "time to commit" time 1704 that provides that the FPGA 322a can process the commands and data to send the corresponding signals 208 by the end of frame 1702. In various embodiments, FPGA 332a controls remote interface module 212 to send data to the corresponding equipment 206 during the current frame 1702 and read data from the corresponding equipment during the following frame 1702.

In various embodiments, configurable I/O controller 204 provides a star architecture with dedicated high speed parallel communication links between control module 210 and remote interface modules 212. In various embodiments, configurable I/O controller 204 provides separate data packets and delta time to commit packets. In various embodiments, configurable I/O controller 204 provides interleaved short send packets and receive packets to minimize communication delays.

Figure 18:
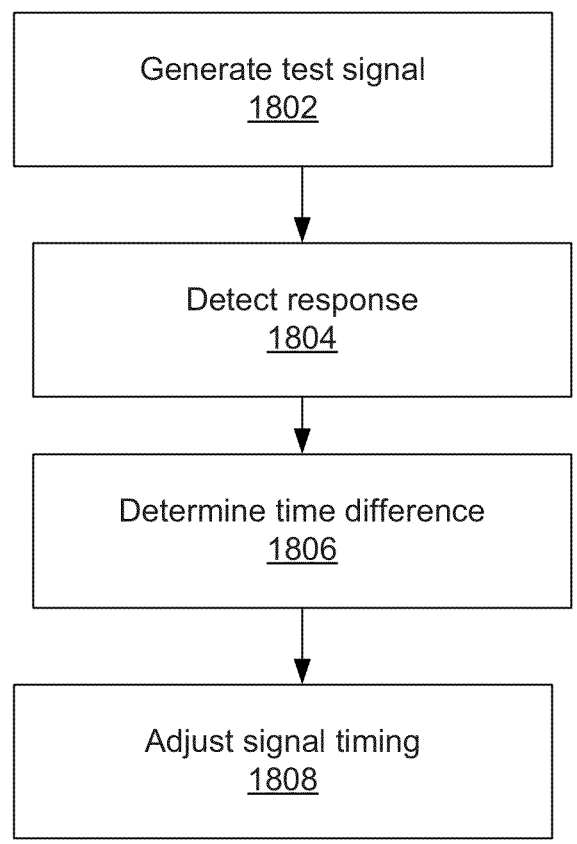
FIG. 18 illustrates a process for adjusting timing of signals of the input/output controller system of FIG. 2.

FIG. 18 illustrates a process for adjusting timing of signals of the input/output controller system 200. In various embodiments, FPGA 302 controls the timing of signals sent to remote interface module 212, and subsequently to equipment 206 such that the signals are received at equipment 206 at a known time. FPGA 302 may calibrate the remote interface module 212 and signal lines between FPGA 302 and remote interface module 212 by sending a test signal to the remote interface module 212 and determining a time of response.

In some embodiments, at 1802, FPGA 302 generates a test signal for each data output signal to one or more remote interface module 212, and, at 1804, detects a response. At 1806, FPGA 302 determines, for each data output signal, a time difference between generating the test signal and receiving from the corresponding remote interface module 212 a data signal that is with the data output signal. At 1808, FPGA 302 adjusts the timing of signals sent to remote interface module 212 based on the determined time differences associated with that remote interface module 212.

In some embodiments, at 1802, FPGA 302 generates test signals for each remote interface module 212, and, at 1804, detects a response. At 1806, FPGA 302 determines, for each remote interface module 212, a time difference between generating the test signal and receiving a response from that remote interface module 212. At 1808, FPGA 302 adjusts timing of the signals sent to remote interface module 212 based on the determined time differences.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

We claim:

1. A controller system comprising:
a plurality of remote interface modules, each remote interface module being configured to be coupled to a corresponding controlled system for receiving a first plurality of input signals from the corresponding controlled system, providing a first plurality of output signals to the corresponding controlled system, and generating a first plurality of data signals based on the first plurality of input signals; and
a control module including an interface coupled to the plurality of remote interface modules to receive the first plurality of data signals from the plurality of remote interface modules, provide a second plurality of data signals to the plurality of remote interface modules, the control module is configured to receive a second plurality of input signals from a host computer and to provide a second plurality of output signals to the host computer, the control module is configurable to selectively generate the second plurality of data signals and the second plurality of output signals based on the first plurality of data signals, the second plurality of input signals, and a first plurality of configuration equations.

2. The controller system of claim 1, wherein the first plurality of configuration equations include associations between the first plurality of input signals, the second plurality of input signals, the first plurality of output signals, and the second plurality of output signals.

3. The controller system of claim 1, wherein the first plurality of configuration equations includes interlock equations.

4. The controller system of claim 3, wherein the interlock equations includes safety interlock equations to prevent specified actions by the controlled system.

5. The controller system of claim 3, wherein the control module includes an input multiplexer configured to receive the first plurality of data signal and the second plurality of input signals and/or includes an output multiplexer configured to provide the second plurality of data signals and the second plurality of output signals,
wherein the first plurality of configuration equations includes multiplexer equations for configuring the input multiplexer or the output multiplexer or both.

6. The controller system of claim 5, wherein the control module is reconfigurable to accommodate permutations of connections to the plurality of remote interface modules via the input multiplexer and the output multiplexer based on changes to the interlock equations or the multiplexer equations or both.

7. The controller system of claim 5, wherein the first plurality of configuration equations includes controller system set up information.

8. The controller system of claim 1, wherein the plurality of remote interface modules is configurable to selectively generate the first plurality of data signals and the first plurality of output signals based on the second plurality of data signals, the first plurality of input signals, and a second plurality of configuration equations.

9. The controller system of claim 8, wherein the second plurality of configuration equations includes multiplexer equations.

10. The controller system of claim 1, further comprising a plurality of data channels, each data channel being coupled between the control module and a corresponding remote interface module, each data channel including two or more data links, each data link providing a corresponding one of the second plurality of data signals as a redundant signal.

11. The controller system of claim 10, wherein the control module includes at least two first configurable logic circuits, each first configurable logic circuit being coupled to a respective data link of each of the plurality of data channels.

12. The controller system of claim 11, wherein the remote interface module includes at least two second configurable logic circuits, each second configurable logic circuit being coupled to a respective data link of each of the plurality of data channels.

13. The controller system of claim 1, wherein the control module includes a configurable logic circuit.

14. The controller system of claim 13, wherein the configurable logic circuit includes at least one field programmable gate array.

15. The controller system of claim 13, wherein each remote interface module includes a configurable logic circuit.

16. The controller system of claim 1, wherein the control module comprises a configurable logic circuit that includes at least one field programmable gate array, wherein each remote interface module includes a configurable logic circuit that includes at least one field programmable gate array.

17. The controller system of claim 1, wherein the control module comprises a configurable logic circuit being configured to be coupled to an external programmer to program the configurable logic circuit based on the first plurality of configuration equations.

18. The controller system of claim 17, wherein the programmer is further configured to receive a spreadsheet, wherein the spreadsheet comprises associations between the first plurality of input signals, the second plurality of input signals, the first plurality of output signals, the second plurality of output signals, and configuration conditions.

19. The controller system of claim 1, wherein the control module further comprises a configuration equation resolver for executing the first plurality of configuration equations.

20. The controller system of claim 1, wherein the control module is further configured to provide at least one data packet and a commit packet to each remote interface module, each remote interface module is further configured to provide an acknowledgement to the control module in response to each at least one data packet and in response to the commit packet, each commit packet including a time for the corresponding remote interface module to perform input and output operations.

21. The controller system of claim 1, wherein the control module is further configured to generate a test signal for each data output signal of the first plurality of data output signals and determine, for each data output signal, a time difference between generating the test signal and receiving a data signal of the first plurality of data signals associated with said each data output signal.

22. The controller system of claim 20, wherein the control module is further configured to adjust timing of the second plurality of data signals based on the determined time differences.

23. The controller system of claim 1, wherein the control module is further configured to generate test signals for each remote interface module, and determines, for each remote interface module, a time difference between generating the test signal and receiving a response from said remote interface module.

24. The controller system of claim 23, wherein the control module is further configured to adjust timing of the second plurality of data signals based on the determined time differences.

25. The controller system of claim 1, wherein the control module further comprises another interface configured to provide the first plurality of data signals, the second plurality of data signals, the second plurality of input signals, the second plurality of output signals, and the first plurality of configuration equations to an external device.

* * * * *